Jan. 30, 1934.  W. A. KRANER  1,945,279
CONCRETE PIPE COUPLING
Filed Feb. 24, 1932
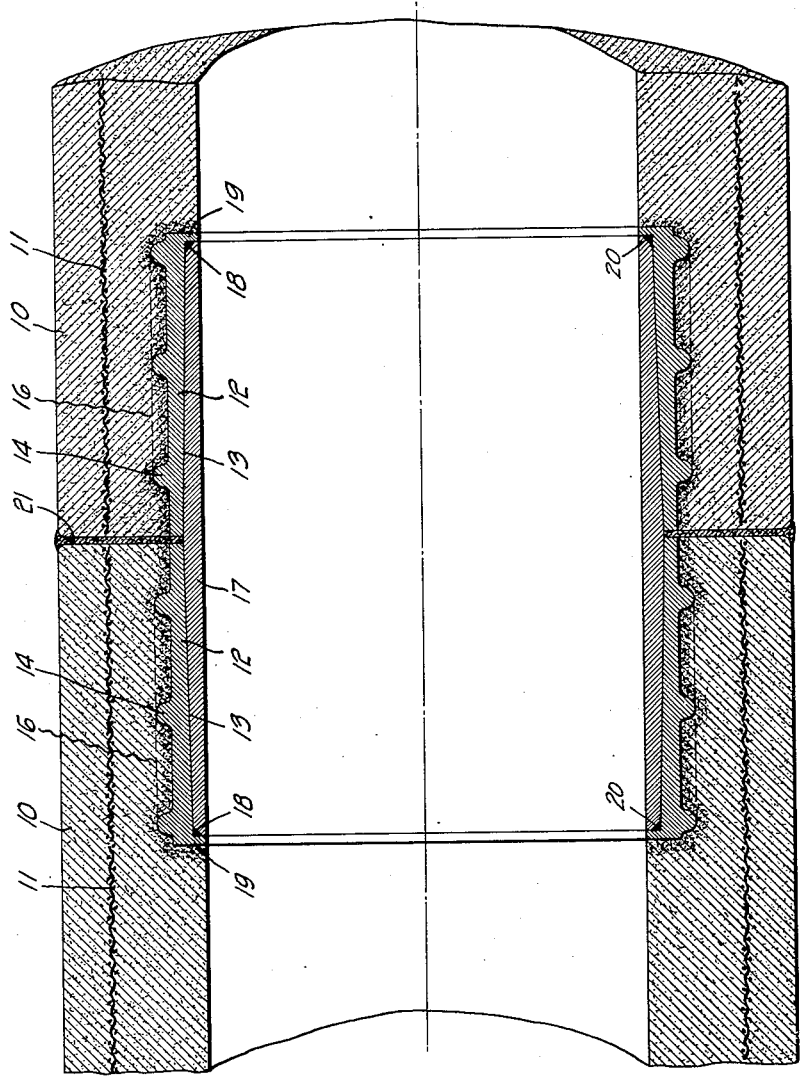
INVENTOR.
W. A. KRANER.
BY
White, Prost, Fehr & Lothrop
ATTORNEYS.

Patented Jan. 30, 1934

1,945,279

UNITED STATES PATENT OFFICE 1,945,279

CONCRETE PIPE COUPLING

Warren A. Kraner, San Francisco, Calif., assignor to Cement Wrapped Pipe Company, Ltd., San Francisco, Calif., a corporation of Arizona Application February 24, 1932. Serial No. 594,895

3 Claims. (Cl. 285—111)

This invention relates generally to couplings for joining together the ends of pipe or conduit sections, and is particularly adapted for pipe or conduit sections made of concrete or similar materials.

It is an object of the present invention to devise a coupling of the above character which will permit a certain amount of contraction and expansion of the concrete pipe sections.

It is a further object of the invention to devise a coupling which will permit a certain amount of lateral flexibility in a pipe line made of concrete sections.

Further objects of the invention are to devise a coupling of the above character which will have a long useful life, which will not interfere with the flow of fluids through the pipe, and which will be at least as strong if not stronger than the pipe sections joined together.

Other objects of the invention will appear from the following description in which the preferred embodiment of the invention has been set forth in detail in conjunction with the accompanying drawing. It is to be understood that the appended claims are to be accorded a range of equivalents consistent with the state of the prior art.

In the past it has been common to manufacture pipe or conduit sections of non-metallic materials such as hydraulic cement, in place of iron, steel or similar metals. The usual way of forming couplings between such pipe sections, is to form an enlarged collar upon one end of a section, into which the end of an adjacent section is adapted to fit. Sealing is then effected by introducing concrete mortar, or soft metal such as lead. Another type of structure proposed is formed by casting a concrete sleeve about the adjacent ends of two concrete pipe sections. Joints of the type just described are subject to many disadvantages and objections. Aside from the cost of labor involved in assembling such joints in the field, they are relatively weak compared to the strength of the pipe sections themselves. A further objection is that concrete pipe sections so joined frequently break or the joints are impaired or broken, due to the absence of provision for allowing some contraction and expansion longitudinally of the pipe sections or flexibility laterally of the pipe line. These disadvantages and others, are overcome by the present invention.

Referring to the single figure of the drawing, my coupling has been shown applied to two concrete pipe sections 10. The walls of these pipe sections are shown reinforced by suitable means, such as an imbedded metallic reinforcement 11. Imbedded in the end portion of each pipe section 10, there is a metallic ring 12, preferably made of a metal which will resist corrosion. The inner periphery of each metallic ring 12 is provided with a relatively smooth machined surface 13, which is preferably on a slight taper, with the largest diameter of the taper adjacent the end of the pipe section. The outer peripheral surfaces of rings 12 are shown provided with circumferential and longitudinal ribs 14 and 16, so as to be securely interlocked and bonded with the concrete bodies of the pipe sections. Rings 12 can be either cast within the concrete pipe sections, or if the pipe sections are formed by a wrapping method, rings 12 are mounted upon the wrapping form so that the concrete is applied over the same. Rings 12 are adapted to fit upon an inner metallic sleeve 17, likewise preferably made of a metal which will not readily corrode. The outer periphery of sleeve 17 is tapered oppositely towards its ends, so that rings 12 can fit snugly upon the same. The ends of sleeves 17 are preferably chamfered as indicated at 18, for a reason which will be presently explained.

In assembling my coupling the rings 12 in the ends of the pipe sections are fitted over the ends of sleeve 17, and the two pipe sections are then forced together, until the end faces of the two pipe sections are just about to meet. The remote ends of rings 12 can be provided with annular flange portions 19, against which the ends of sleeve 17 can abut. Obviously the nature of the fit produced between the rings 12 and the sleeve 17 can be varied to suit different conditions. For example this can be an extremely tight forced fit, or a substantially metal to metal contact can be formed immediately before the pipe sections are forced to final position, in which event less force will be required during assembly. To insure an absolute seal between the rings 12 and sleeve 17, I prefer to coat the exterior surface of sleeve 17 and the inner surfaces of rings 12, with a suitable material such as asphaltic paint, or white lead, before the joint is assembled. In this event the chamfered edges 18 cause a certain amount of this paint to be trapped within the annular recesses 20, thus affording a seal at this point. After the joint has been assembled, the space 21 between the adjacent faces of the pipe sections is filled with a suitable material, such as a Portland cement mortar.

It will be apparent from the preceding description that my joint has many advantages. It will have considerably greater strength than the strength of the concrete pipe sections joined together. It will also allow a certain amount of expansion and contraction of the pipe sections, to relieve longitudinal stresses in the event of severe temperature changes. In the event of lateral forces being applied to the pipe line, my joints will afford a certain amount of give, without breakage, thus relieving lateral stresses upon the pipe sections. In connection with such lateral flexibility, it is to be noted that the metallic parts of my joint can be made of relatively soft metal which will give a certain amount, without causing breakage. My joint will also have a long useful life, particularly if metals not subject to corrosion are utilized, and because the internal diameter of sleeve 17 is the same as the internal diameter of the pipe sections, no obstructions are imposed in the path of fluid flowing through the line.

I claim:

1. In a coupling or joint for concrete pipe sections, a metallic sleeve having an internal diameter corresponding to that of the pipe sections, and metallic rings imbedded in the end portions of the concrete pipe sections to be joined, the inner peripheral surfaces of said rings being adapted to fit upon the outer periphery of said sleeve, the remote ends of said rings being provided with annular flange portions having an internal diameter corresponding to that of the pipe sections.

2. In a coupling or joint for concrete pipe sections, a metallic sleeve having an internal diameter corresponding to that of the pipe and having its outer periphery tapered oppositely towards the ends of the sleeve, and metallic rings imbedded in the end portions of the concrete pipe sections to be joined and having no direct mechanical connection, said rings also having ribs formed upon their outer periphery to imbed with the concrete of said pipe sections, and having inner peripheries tapered to fit upon the outer periphery of said sleeve.

3. In a coupling or joint for concrete pipe sections, a metallic sleeve having its outer periphery tapered oppositely towards the ends of the sleeve, metallic rings embedded in the end portions of the concrete pipe sections to be joined, said rings having their inner periphery tapered to fit upon the outer periphery of the sleeve, the pipe sections and the sleeves being so formed as to afford opposed end faces on the concrete pipe sections, and a mortar seal between the end faces of the pipe sections and bonded to the concrete.

WARREN A. KRANER.